(12) United States Patent
Prabhu

(10) Patent No.: US 10,454,769 B2
(45) Date of Patent: Oct. 22, 2019

(54) METHOD AND SYSTEM FOR SYNCHRONIZING POLICY IN A CONTROL PLANE

(71) Applicant: Cisco Technology, Inc., San Jose, CA (US)

(72) Inventor: Vinay Prabhu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 389 days.

(21) Appl. No.: 15/287,373

(22) Filed: Oct. 6, 2016

(65) Prior Publication Data
US 2018/0367406 A1 Dec. 20, 2018

(51) Int. Cl.
| | | |
|---|---|---|
| H04L 12/24 | (2006.01) | |
| H04L 29/06 | (2006.01) | |
| H04L 12/715 | (2013.01) | |
| H04L 12/813 | (2013.01) | |
| H04L 29/08 | (2006.01) | |

(52) U.S. Cl.
CPC ........ *H04L 41/0893* (2013.01); *H04L 41/085* (2013.01); *H04L 41/20* (2013.01); *H04L 45/64* (2013.01); *H04L 47/20* (2013.01); *H04L 63/20* (2013.01); *H04L 67/1095* (2013.01); *H04L 67/26* (2013.01)

(58) Field of Classification Search
CPC ... H04L 63/20; H04L 41/0813; H04L 41/085; H04L 41/0893
See application file for complete search history.

(56) References Cited

U.S. PATENT DOCUMENTS

| | | | | |
|---|---|---|---|---|
| 2007/0147424 A1* | 6/2007 | Anigstein | ............... | H04L 25/14 370/469 |
| 2014/0173322 A1* | 6/2014 | Pyeon | ....................... | G06F 1/04 713/400 |
| 2016/0094461 A1* | 3/2016 | Shetty | ..................... | H04L 47/20 370/235 |
| 2016/0219503 A1* | 7/2016 | Kim | ....................... | H04W 8/065 |

OTHER PUBLICATIONS

International Search Report dated Dec. 26, 2017 as received in Application No. PCT/US2017/055443.
Written Opinion of the International Searching Authority dated Dec. 26, 2017 as received in Application No. PCT/US2017/055443.

* cited by examiner

*Primary Examiner* — David R Lazaro
(74) *Attorney, Agent, or Firm* — Polsinelli PC

(57) ABSTRACT

A method and system for synchronizing policy in a control plane are provided. The method includes associating, by a network management system (NMS), a first identifier (ID) with a first policy of a network, wherein the first ID uniquely identifies the first policy. The method also includes pushing, by the NMS, the first policy to the control plane including a plurality of controllers. Further, the method includes exchanging, by the NMS, the first ID with the plurality of controllers. Moreover, the method includes determining, by the NMS, at least one controller from which confirmation of the first ID is not received as a stale controller.

20 Claims, 10 Drawing Sheets

US 10,454,769 B2

METHOD AND SYSTEM FOR SYNCHRONIZING POLICY IN A CONTROL PLANE

TECHNICAL FIELD

The present disclosure relates to a method and a system for synchronizing policy in a control plane and, more particularly, to a method and system for assigning an identifier to a policy and using that for synchronizing policy in the control plane.

BACKGROUND

Over a period of time, use of software defined network (SDN) has increased. The reason behind the increase is the convenience with which such network can be managed. One example SDN 100 is shown in FIG. 1 (prior art). The SDN 100 includes a network management system (NMS) 102 for managing policies and other things in the SDN 100. The SDN 100 also includes a management software 104 for managing network in conjunction with the NMS 102. The SDN 100 further includes a controller pool 106 (also referred to as a control plane) including a plurality of controllers, such as a controller 108A, a controller 108B and a controller 108C. Each controller is connected to one or more routers, for example, the controller 108A is connected to a router 114A via a connection 112A and to a router 114B via a connection 112C. The controller 108B is connected to the router 114A via a connection 112B, to the router 114B via a connection 112D, and to a router 114C via a connection 112E. The controller 108C is connected to the router 114C via a connection 112F. The NMS 102 pushes policy in the network by pushing the policy to the controllers which, in turn, pushes the policy to the routers. However, there may arise a situation in which a controller loses its connectivity with the NMS 102.

FIG. 2 (prior art) indicates a scenario 200 in which the controller 108C has a broken connection 202 with the NMS 102. The NMS 102 pushes a new policy (shown via 204) to the controllers. All controllers except the controller 108C receive the new policy. This results in the controller pool 106 going out of sync and hence, no longer behaving as a single redundant control plane across internet protocol (IP) fabric. In light of this, it becomes very difficult to predict network/routing behaviour in the network.

FIG. 3 (prior art) indicates a solution 300 in which the NMS 102 blocks push of the new policy to the network, as shown by 302, till connectivity to all controllers in the controller pool 106 is restored. However, such a solution stops critical policy changes that may be needed urgently in the network. In addition, the solution stops pushing the new policy change to controllers that did not lose the connectivity. Further, the solution is prone to having similar issue, i.e. loss of connectivity with the controller 108C, again while the push of new policy is in process.

FIG. 4 (prior art) indicates a solution 400 in which the NMS 102 pushes the new policy to the network, as shown by 204 and simultaneously informs the management software 104 that the controller 108C has lost connectivity. The management software 104 then removes name of the controller 108C from a list of valid controllers. The list of valid controllers include controllers with which routers can establish connection. However, such a solution causes exclusion of the controller 108C from the list of valid controllers. In addition, the solution causes the controller 108C to break connections with connected routers and to re-establish those connections later on when the connection of the controller 108C with the NMS 102 is re-established. Further, the solution raises a requirement of establishing a signaling mechanism between the NMS 102 and the management software 104.

Therefore, there is a need for a method and a system for assigning an identifier to a policy and using that for synchronizing policy in the control plane.

SUMMARY

Various methods, apparatuses and computer readable mediums for synchronizing policy in a control plane are provided.

In one embodiment, the method includes associating, by a network management system (NMS), a first identifier (ID) with a first policy of a network, wherein the first ID uniquely identifies the first policy. The method also includes pushing, by the NMS, the first policy to the control plane including a plurality of controllers. Further, the method includes exchanging, by the NMS, the first ID with the plurality of controllers. Moreover, the method includes determining, by the NMS, at least one controller from which confirmation of the first ID is not received as a stale controller.

In another embodiment, the method includes receiving, by a plurality of controllers of a control plane, a first policy from a network management system (NMS), wherein the first policy is assigned a first identifier (ID) that uniquely identifies the first policy. The method also includes exchanging, by a first controller of the plurality of controllers, the first ID with the NMS to indicate that the first controller is in connection with the NMS. Further, the method includes not exchanging, by a second controller of the plurality of controllers, the first ID with the NMS to indicate that the second controller has broken connection with the NMS.

In yet another embodiment, the method includes associating, by a network management system (NMS), a first identifier (ID) with a first policy of a network, wherein the first ID uniquely identifies the first policy. The method also includes pushing, by the NMS, the first policy to the control plane comprising a plurality of controllers. Further, the method includes determining, by the NMS, a list of stale controllers and a list of controllers-in-sync from among the plurality of controllers based on exchanging the first ID with the plurality of controllers, wherein the at least one state controller is determined based on non-receipt of confirmation of the first ID at the NMS while exchanging the first ID. Moreover, the method includes managing one or more connections of a router to the control plane such that the one or more connections of the router are prioritized with the list of controllers-in-sync over with the list of stale controllers.

In one embodiment, a network management system (NMS) includes a processor, and a memory coupled to the processor. The memory stores instructions which when executed cause the NMS to perform a method to synchronize policy in a control plane, the method including associating a first identifier (ID) with a first policy of a network, wherein the first ID uniquely identifies the first policy. The method also includes pushing the first policy to the control plane including a plurality of controllers. The method further includes exchanging the first ID with the plurality of controllers. Moreover, the method includes determining at least one controller from which confirmation of the first ID is not received as a stale controller.

In one embodiment, a system for synchronizing policy in a control plane includes a plurality of controllers. The systems also includes a network management system (NMS)

coupled to the plurality of controllers for associating a first identifier (ID) with a first policy of a network, wherein the first ID uniquely identifies the first policy. The NMS also pushes the first policy to the plurality of controllers. Further, the NMS also determines a list of stale controllers and a list of controllers-in-sync from among the plurality of controllers based on exchanging the first ID with the plurality of controllers, wherein the at least one state controller is determined based on non-receipt of confirmation of the first ID at the NMS while exchanging the first ID. Further, the system includes one or more routers configured to connect with the list of controllers-in-sync over with the list of stale controllers.

In one embodiment, a non-transitory computer-readable medium having stored instructions which when executed by a network management system (NMS) causes the NMS to perform a method to synchronize policy in a control plane is provided. The method includes associating a first identifier (ID) with a first policy of a network, wherein the first ID uniquely identifies the first policy. The method also includes pushing the first policy to the control plane including a plurality of controllers. The method further includes exchanging the first ID with the plurality of controllers. Moreover, the method includes determining at least one controller from which confirmation of the first ID is not received as a stale controller.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
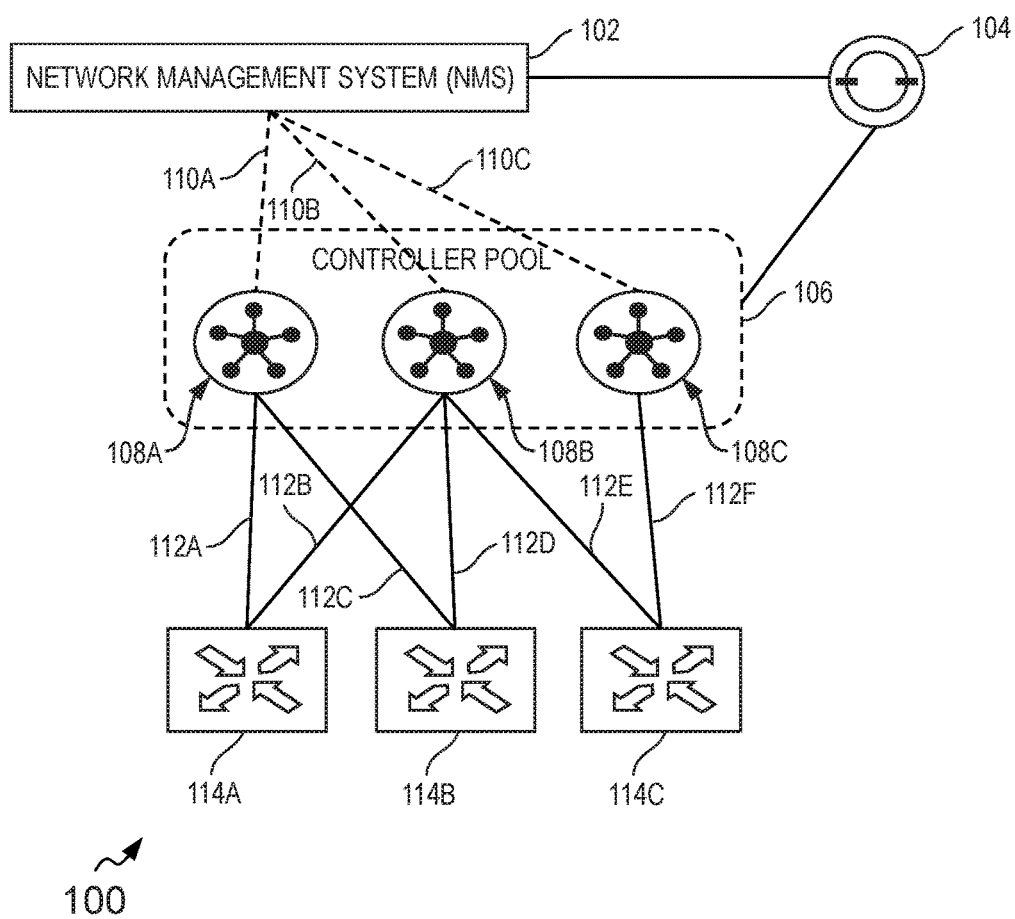
FIG. 1 shows a prior art.
Figure 2:
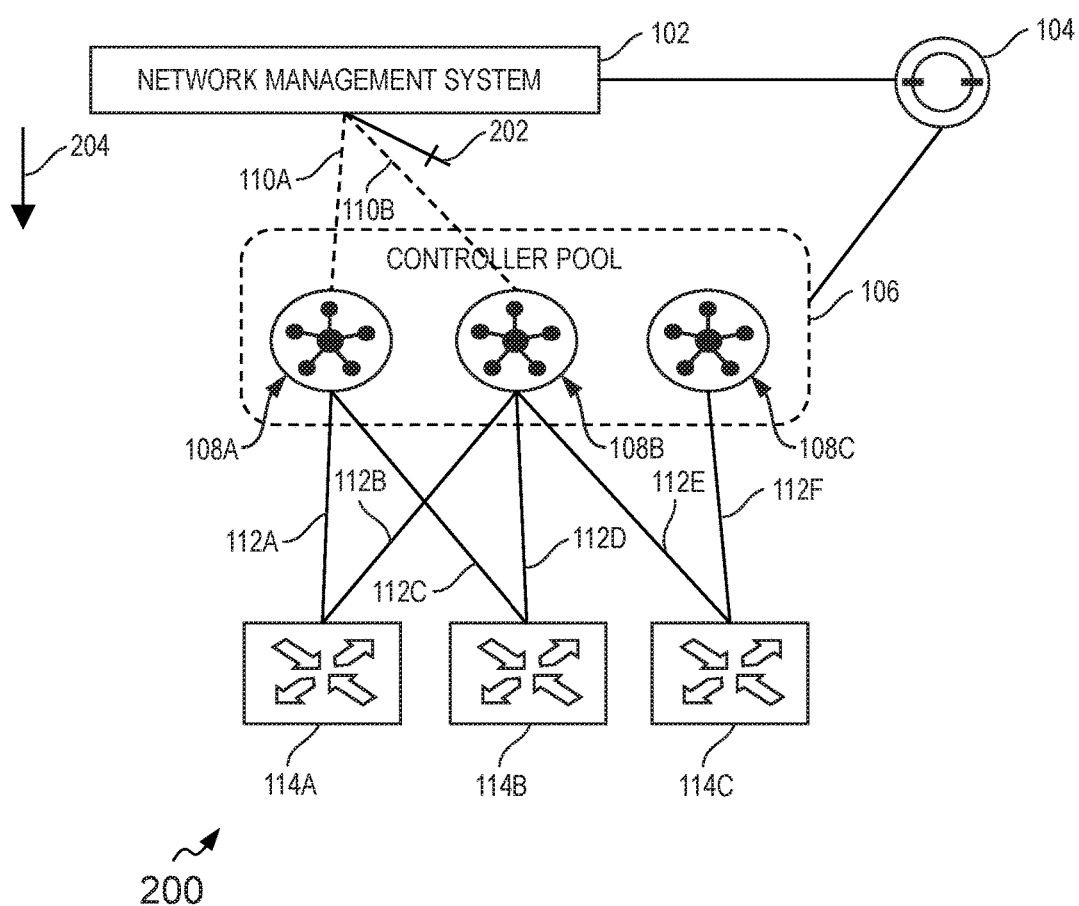
FIG. 2 shows another prior art.
Figure 3:
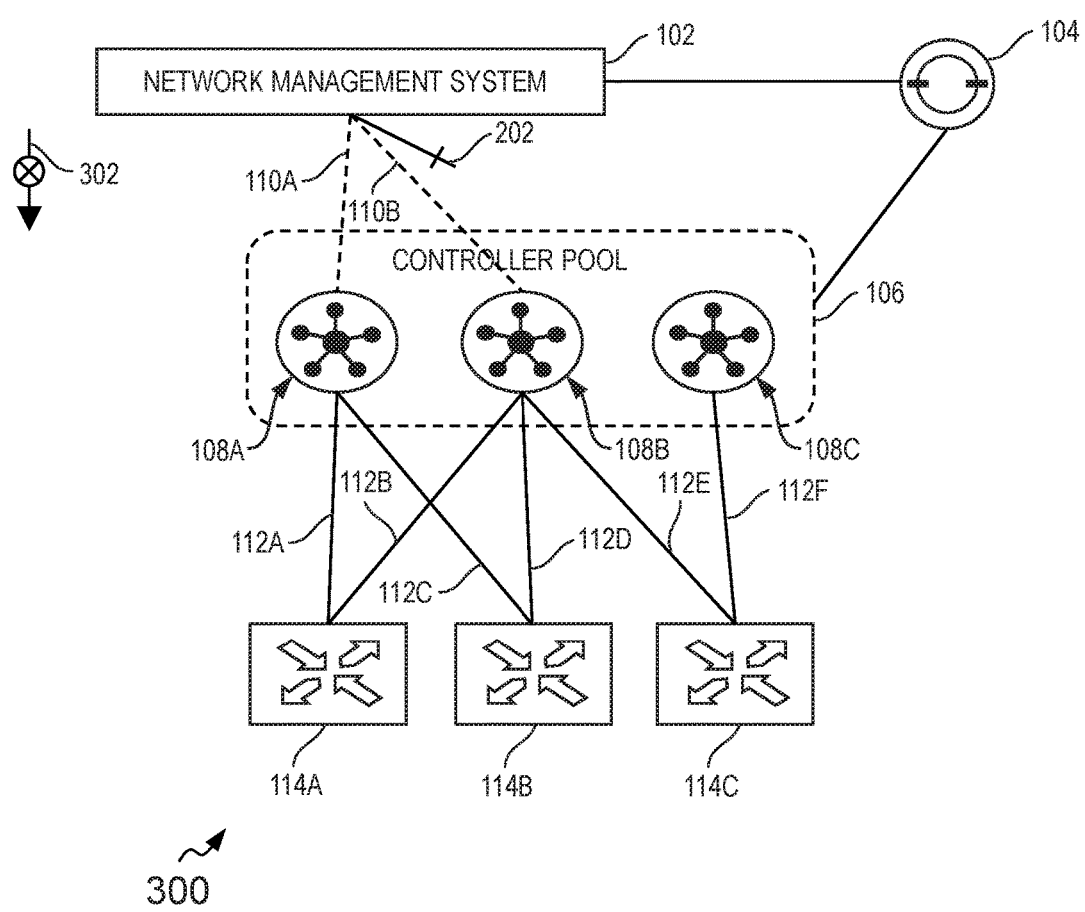
FIG. 3 shows yet another prior art.
Figure 4:
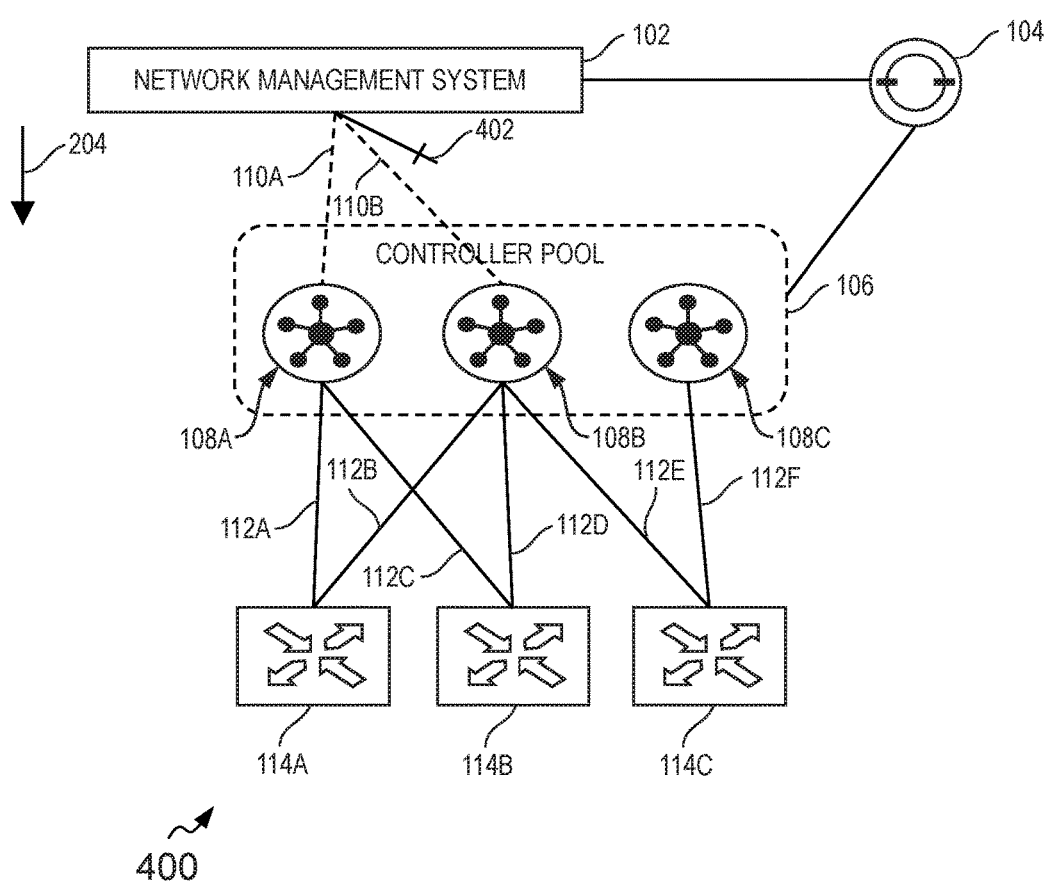
FIG. 4 shows still another prior art.
Figure 5:
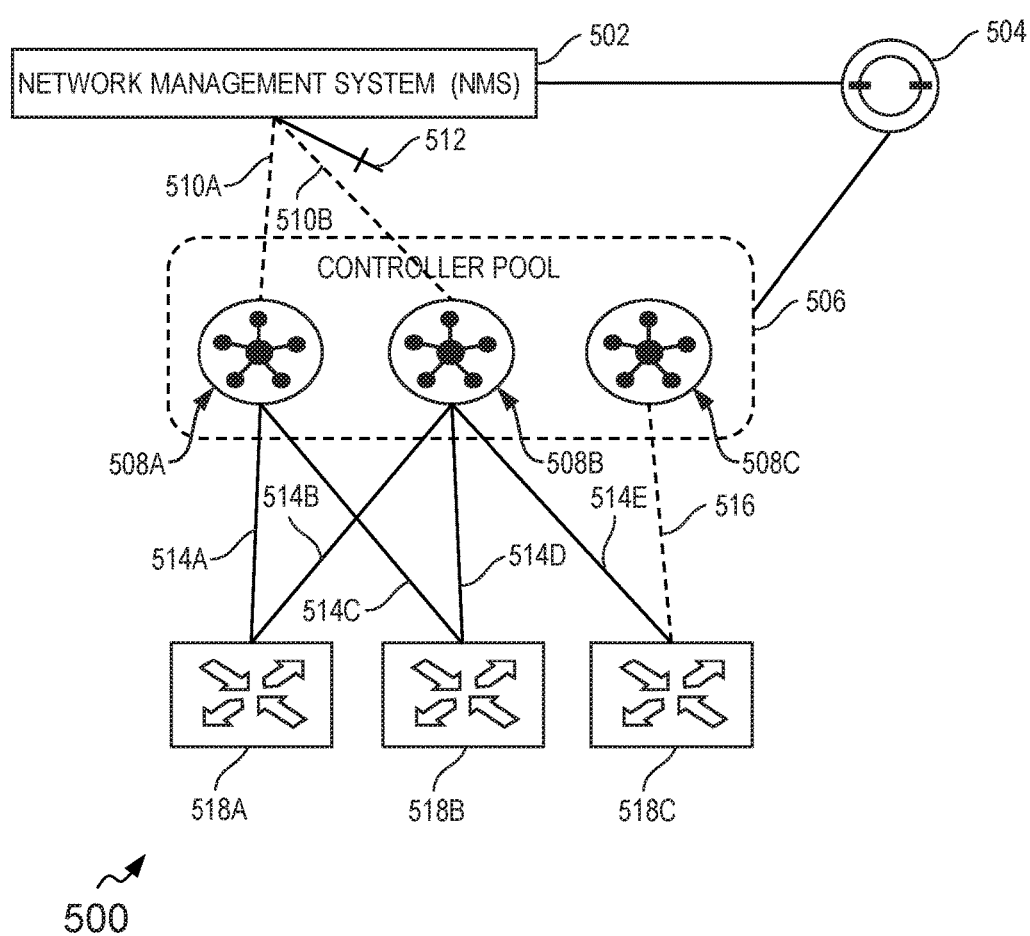
FIG. 5 illustrates an environment, in accordance with an example embodiment of the present disclosure.

FIG. 5 illustrates an environment 500, in accordance with an example embodiment of the present disclosure.

Example of the environment 500 includes, but is not limited to, a software defined network (SDN). The SDN can be present or implemented at number of locations including, but not limited to, banks, retail merchants, and healthcare facilities. In one embodiment, the SDN is a SD-wide area network (SD-WAN).

The environment 500 includes a network management system (NMS) 502. The NMS 502 enables centralized configuration and management of the SDN, and may also provide a real-time dashboard on health of the SDN. The environment 500 also includes a management software 504. The management software 504 is in communication with the NMS 502 is used to manage signalling and policy pushing in the network in conjunction with the NMS 502.

The environment 500 also includes a plurality of controller groups in a controller pool 506. The controller pool 506 includes a controller 508A, a controller 508B, and a controller 508C. In illustrated embodiment, the controller 508A is connected to the NMS 502 via a connection 510A, and the controller 508B is connected to the NMS 502 via a connection 510B. However, the controller 508C does not have connectivity with the NMS 502. Instead, the controller 508C has a broken connection 512 with the NMS 502. The controllers 508A, 508B and 508C are individually also referred to as a 'controller 508' and are collectively referred to as 'controllers 508'.

The environment 500 also includes a plurality of nodes, for example a node 518A, a node 518B, and a node 518C. In illustrated embodiment, each of the nodes 518A, 518B and 518C is a router. The nodes 518A, 518B and 518C are also referred to as routers 518A, 518B and 518C, respectively in the present description. Hence, the environment 500 includes the router 518A, the router 518B, and the router 518C (individually also referred to as a 'router 518' and collectively referred to as 'routers 518'). It is to be appreciated that the remaining description is explained using the router as an example.

The devices, i.e. the NMS 502, the management software 504, the controller pool 506, the controllers 508, and the routers 518, of the environment 500 are communicatively coupled via an intermediate network, such a wide area network (WAN). The routers 518 may be located at different geographic locations, branches, remote offices, data centers, customer premises, or on different circuits, carrier networks etc. The routers provide highly secure data connectivity over any transport.

The routers 518 can be connected to the controllers of the controller pool 506 via WAN or Broadband internet or 4G/LTE, or any other type of network. For example, the router 518A is connected to the controller 508A via a connection 514A and is connected to the controller 508B via a connection 514B. Similarly, the router 518B is connected to the controller 508A via a connection 514C and to the controller 508B via a connection 514D, and the router 518C is connected to the controller 508C via a connection 516 and to the controller 508B via a connection 514E. Each of the connection 514A to 514E (individually referred to as 'connection 514' and collectively referred to as 'connections 514') can be referred to as a control channel or control connection.

Despite the controller 508C having the broken connection 512 with the NMS 502, the controller 508C has an established connection with the router 518C. The established connection is achieved using the functionality of the environment 500 which is explained in details below.

In one embodiment, the controller pool 506 is referred to as the control plane. In another embodiment, the control plane in addition to the controller pool 506 can also include the NMS 502, the management software 504, and associated connections. In yet another embodiment, the control plane in addition to the controller pool 506 can also include the NMS 502, the management software 504, the connections 514, and the routers 518. In still another embodiment, the control plane in addition to the controller pool 506 can also include the connections 514 and the routers 518.

The functioning of the environment 500 is now explained using example of identifiers (IDs) for policies. It is to be appreciated that any mechanism other than IDs can also be used.

Initially, the NMS 502 associates a first ID to a first policy to be pushed to the network. The NMS 502 then pushes the first policy to the control plane including the plurality of controllers of the controller pool 506. There may be one or more controller pools. For example, a distributed control plane may have more than one controller pool based on geographical location and other parameters. The controllers receive the first policy from the NMS 502. The NMS 502 also exchanges the first ID of the first policy with each controller of the controller pool 506. In illustrated embodiment, the NMS 502 determines at least one controller, such as the controller 508C from which confirmation of the first ID is not received as a stale controller. The NMS 502 also determines the controller 508A and the controller 508B as controllers-in-sync because the exchange of the first ID happens between the NMS 502 and each controller of the controller 508A and the controller 508B. The NMS 502 also communicates the information regarding the controller 508C being stale, i.e. broken connection 512 between the NMS 502 and the controller 508C, to the management software 504. The management software 504 removes the controller 508C from a list of valid controllers. The list of valid controllers includes controllers having connection with the NMS 502, i.e. the controllers that are controllers-in-sync. The routers 518 are then configured to connect to those controllers that are the controllers-in-sync. The exchange of IDs help the NMS 502 and the management software 504 know that the controller 508C is stale and the routers 518 are accordingly configured to connect to the controllers that are the controllers-in-sync. The first policy, i.e. new policy, is also pushed without any wait or block and the controller 508C still maintains the connection with the router 518C thereby avoiding broken connection between the controller 508C and the router 518C and then avoiding re-establishment of the connection between the controller 508C and the router 518C.

In various embodiments, if the NMS 502 receives a second policy to be pushed to the control plane, then the NMS 502 associates the second policy with a second ID and pushes the second policy to the control plane without any waiting. The second ID is an incremented version of the first ID. The IDs can be assigned or associated using any existing technology. The second ID uniquely identifies the second policy.

In some embodiments, the synchronization of IDs also take place between various control plane components, such as between the controllers, and marking the controller, such as the controller 508C as stale.

Figure 6:
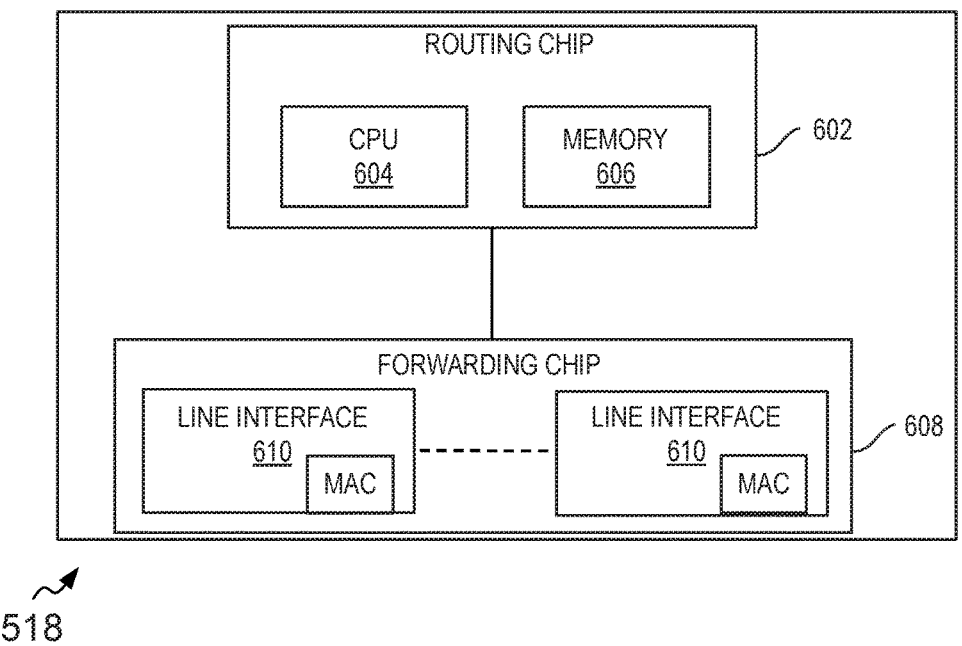
FIG. 6 illustrates a router, in accordance with an example embodiment of the present disclosure.

FIG. 6 shows a block diagram of the router 518, in accordance with an embodiment of the present disclosure. Referring to FIG. 6, the router 518 includes a routing chip 602 coupled to a forwarding chip 608. The routing chip 602 performs functions such as path computations, routing table maintenance, and reachability propagation and other functions as described herein. Components of the routing chip 602 include a CPU 604 or processor, which is coupled to a memory 606. The memory 606 stores instructions to perform the methods disclosed herein. The forwarding chip 608 is responsible for packet forwarding along a plurality of line interfaces 610.

Figure 7:
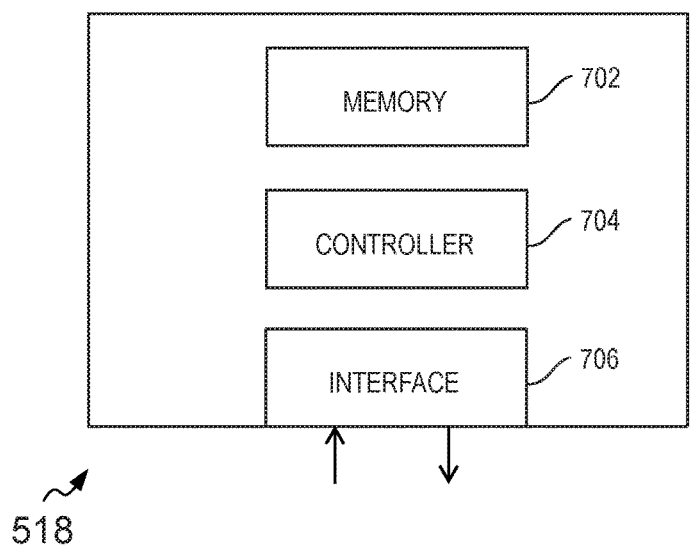
FIG. 7 illustrates a router, in accordance with another example embodiment of the present disclosure.

An example configuration of the router 518 is now described by reference to FIG. 7, according to another embodiment of the present disclosure. The router 518 includes a memory 702, a controller 704 and an interface 706. The memory 702, may be a volatile memory, or may alternatively be a non-volatile memory, or persistent memory, that can be electrically erased and reprogrammed and that may be implemented, for example, as a flash memory or as a data storage module. The memory 702 could further represent a plurality of memory modules including volatile and/or non-volatile modules. The controller 704 may be any commercially available, general purpose processor, or may be specifically designed for operation in the router 518. The controller 704 may be operable to execute processes related to the present disclosure described above in addition to numerous other processes. The controller 704 may also include an array of processors and/or controllers. The interface 706 communicates with controllers. It may be implemented as one single device or as distinct devices for receiving and sending signaling, messages and data. The router 518 may include, in various embodiments, various types of devices such as, for example, a satellite TV decoder, a cable TV decoder, a personal computer, a gaming device, a router, and the like. Therefore, the interface 706 may include a plurality of devices for connecting on links of different types. Only one generic interface 706 is illustrated for ease of presentation of the present disclosure.

Figure 8:
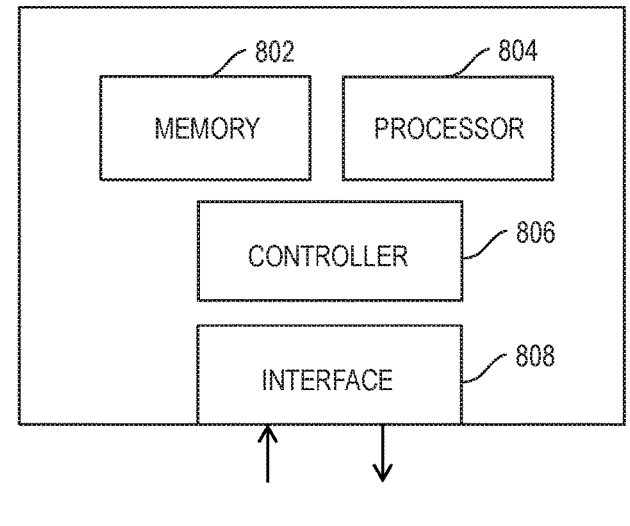
FIG. 8 illustrates a controller, in accordance with an example embodiment of the present disclosure.

An example configuration of a controller 508 is now described by reference to FIG. 8, which shows exemplary controller hardware/system according to an aspect of the present disclosure. The controller 508 includes a memory 802, a processor 804, a controller 806, and an interface 808. The memory 802, may be a volatile memory, or may alternatively be a non-volatile memory, or persistent memory, that can be electrically erased and reprogrammed and that may be implemented, for example, as a flash memory or as a data storage module. The memory 802 could further represent a plurality of memory modules including volatile and/or non-volatile modules. The processor 804 as well as the controller 806 may be any commercially available, general-purpose processor, or may be specifically designed for operation in the controller 508. One or both of the processor 804 and the controller 806 may also include arrays of processors and/or controllers. These two elements, the processor 804 and the controller 806 are shown as distinct components of FIG. 8 in order to better highlight their respective features. However, those skilled in the art will readily recognize that the processor 804 and the controller 806 may be combined in a generic processing element or an appropriately designed or programmed processing element, capable of performing features of both the processor 804 and the controller 806. The processor 804 and the controller 806 may both be operable to execute processes related to the present disclosure as described above in addition to numerous other processes. The interface 808 communicates with other routers. It may be implemented as one single device or as distinct devices for receiving and sending signaling, messages and data. The controller 508 may include, in various embodiments, various types of devices such as, for example, a satellite TV transmitter, a cable TV transmitter, a specially programmed internet protocol server, routers, servers, and the like. The controller 508 may communicate with routers either directly or through physical intermediate nodes. Therefore, the interface 808 may include a plurality of devices for connecting on links of different types. Only one generic interface 808 is illustrated for ease of presentation of the present disclosure.

Figure 9:
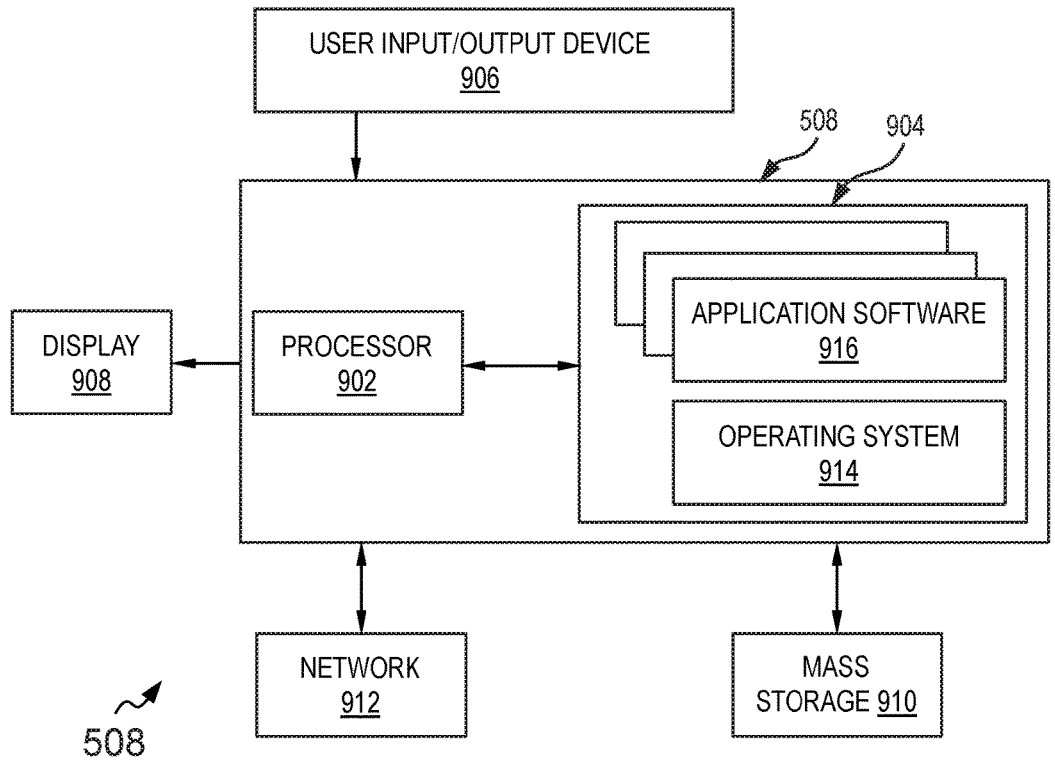
FIG. 9 illustrates a controller, in accordance with another example embodiment of the present disclosure.

FIG. 9 shows an example of the controller 508, in accordance with another embodiment. The controller 508 may include at least one processor 902 coupled to a memory 904. The processor 902 may represent one or more processors (e.g., microprocessors), and the memory 904 may represent random access memory (RAM) devices including a main storage of the hardware, as well as any supplemental levels of memory e.g., cache memories, non-volatile or back-up memories (e.g., programmable or flash memories), read-only memories, etc. In addition, the memory 904 may be considered to include memory storage physically located elsewhere in the hardware, e.g. any cache memory in the processor 902, as well as any storage capacity used as a virtual memory, e.g., as stored on a mass storage device.

The controller 508 also typically receives a number of inputs and outputs for communicating information externally. For interface with a user or operator, the controller 508 may include one or more user input-output (I/O) devices 906 (e.g., a keyboard, mouse, etc.) and a display 908. For additional storage, the controller 508 may also include one or more mass storage devices 910, e.g., a Universal Serial Bus (USB) or other removable disk drive, a hard disk drive, a Direct Access Storage Device (DASD), an optical drive (e.g., a Compact Disk (CD) drive, a Digital Versatile Disk (DVD) drive, etc.) and/or a USB drive, among others. Furthermore, the controller 508 may include an interface with one or more networks interface 912 to connect to networks such as a local area network (LAN), a wide area network (WAN), a wireless network, and/or the Internet among others to permit the communication of information with other computers coupled to the networks. It should be appreciated that the controller 508 typically includes suitable analog and/or digital interfaces between the processor 902 and each of the components, as is well known in the art.

The controller 508 operates under the control of an operating system 914, and executes application software 916 which includes various computer software applications, components, programs, objects, modules, etc. to perform the techniques described above.

Figure 10:
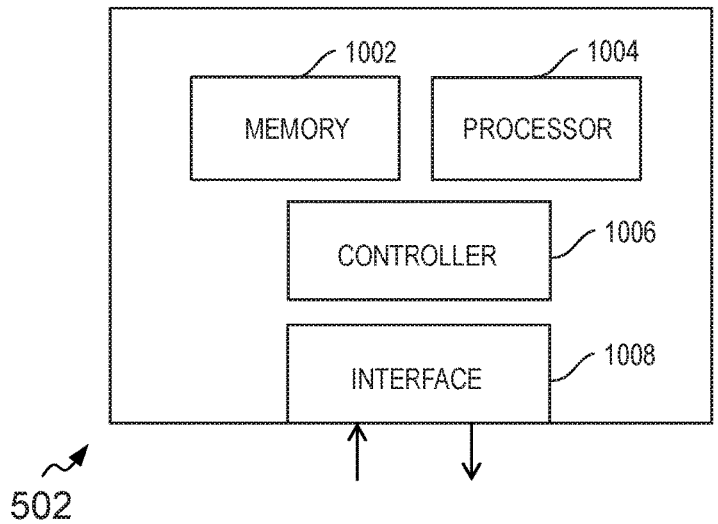
FIG. 10 illustrates a network management system (NMS), in accordance with an example embodiment of the present disclosure.

An example configuration of a NMS 502 is now described by reference to FIG. 10, which shows an example controller hardware/system according to an embodiment of the present disclosure. The NMS 502 includes a memory 1002, a processor 1004, a controller 1006, and an interface 1008. The memory 1002, may be a volatile memory, or may alternatively be a non-volatile memory, or persistent memory, that can be electrically erased and reprogrammed and that may be implemented, for example, as a flash memory or as a data storage module. The memory 1002 could further represent a plurality of memory modules including volatile and/or non-volatile modules. The processor 1004 as well as the controller 1006 may be any commercially available, general-purpose processor, or may be specifically designed for operation in the NMS 502. One or both of the processor 1004 and the controller 1006 may also include arrays of processors and/or controllers. These two elements, the processor 1004 and the controller 1006 are shown as distinct components of FIG. 10 in order to better highlight their respective features. However, those skilled in the art will readily recognize that the processor 1004 and the controller 1006 may be combined in a generic processing element or an appropriately designed or programmed processing element, capable of performing features of both the processor 1004 and the controller 1006. The processor 1004 and the controller 1006 may both be operable to execute processes related to the present disclosure as described above in addition to numerous other processes. The interface 1008 communicates with other routers. It may be implemented as one single device or as distinct devices for receiving and sending signaling, messages and data. The NMS 502 may communicate with controllers either directly or through physical intermediate nodes, such as the management software 504. Therefore, the interface 1008 may include a plurality of devices for connecting on links of different types. Only one generic interface 1008 is illustrated for ease of presentation of the present disclosure.

Figure 11:
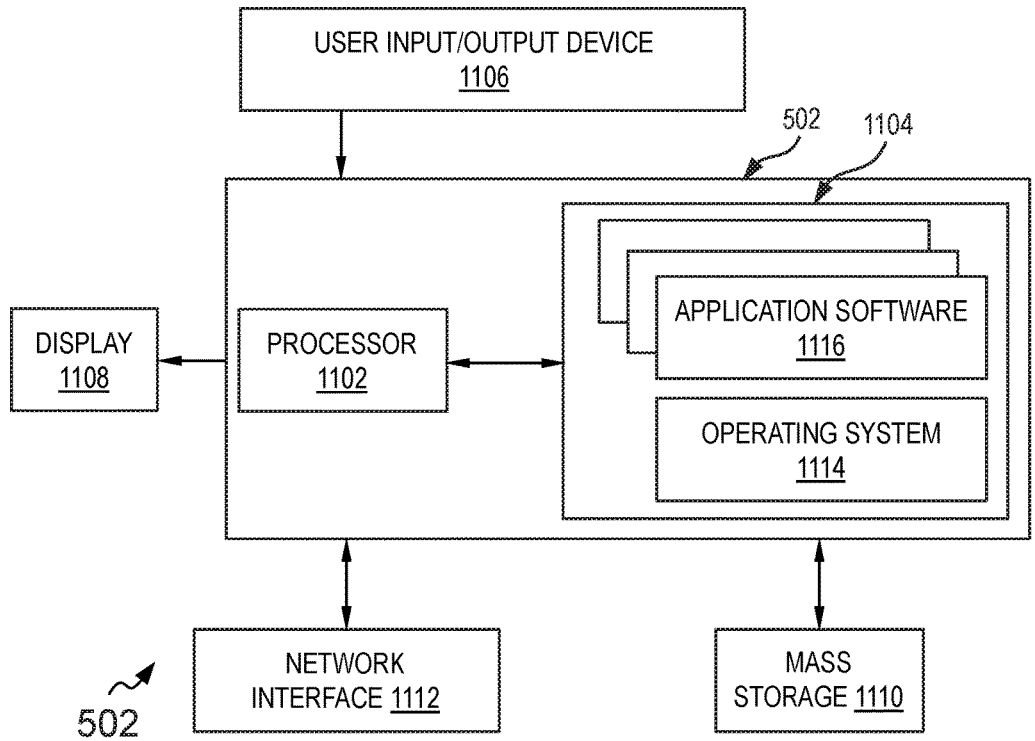
FIG. 11 illustrates a NMS, in accordance with another example embodiment of the present disclosure.

FIG. 11 shows an example of the NMS 502, in accordance with another embodiment. The NMS 502 may include at least one processor 1102 coupled to a memory 1104. The processor 1102 may represent one or more processors (e.g., microprocessors), and the memory 1104 may represent random access memory (RAM) devices including a main storage of the hardware, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware, e.g. any cache memory in the processor 1102, as well as any storage capacity used as a virtual memory, e.g., as stored on a mass storage device.

The NMS 502 also typically receives a number of inputs and outputs for communicating information externally. For interface with a user or operator, the NMS 502 may include one or more user input-output (I/O) devices 1106 (e.g., a keyboard, mouse, etc.) and a display 1108. For additional storage, the NMS 502 may also include one or more mass storage devices 1110, e.g., a Universal Serial Bus (USB) or other removable disk drive, a hard disk drive, a Direct Access Storage Device (DASD), an optical drive (e.g., a Compact Disk (CD) drive, a Digital Versatile Disk (DVD) drive, etc.) and/or a USB drive, among others. Furthermore, the NMS 502 may include an interface with one or more networks interface 1112 to connect to networks such as a local area network (LAN), a wide area network (WAN), a wireless network, and/or the Internet among others to permit the communication of information with other computers coupled to the networks. It should be appreciated that the NMS 502 typically includes suitable analog and/or digital interfaces between the processor 1102 and each of the components, as is well known in the art.

The NMS 502 operates under the control of an operating system 1114, and executes application software 1116 which includes various computer software applications, components, programs, objects, modules, etc. to perform the techniques described above.

In general, the routines executed to implement the embodiments of the present disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects of the invention. Moreover, while the present disclosure has been described in the context of fully functioning computers and computer systems, those skilled in the art will appreciate that the various embodiments of the invention are capable of being distributed as a program product in a variety of forms, and that the present disclosure applies equally regardless of the particular type of machine or computer readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 12:
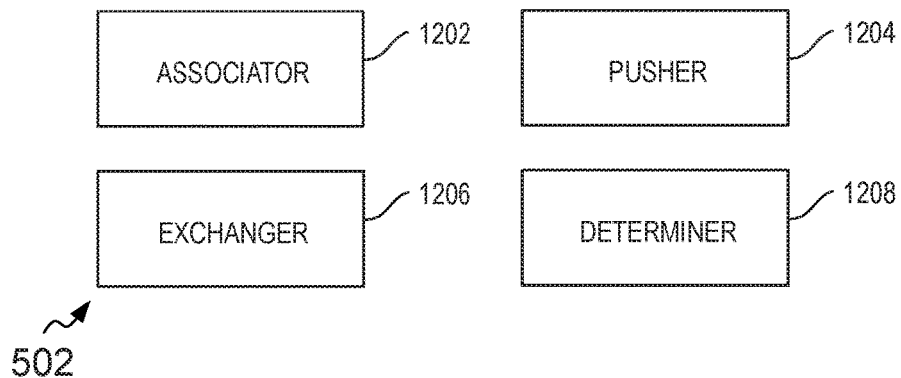
FIG. 12 illustrates a block diagram of a NMS indicating various blocks for synchronizing policy in a control plane, in accordance with an example embodiment of the present disclosure.

FIG. 12 illustrates a block diagram of the NMS 502 indicating various blocks synchronizing policy in a control plane, in accordance with an example embodiment of the present disclosure.

The NMS 502 includes an associator 1202 for associating a first identifier (ID) with a first policy of a network. The first ID uniquely identifies the first policy.

The NMS 502 also includes a pusher 1204 for pushing the first policy or any other policy to the control plane including a plurality of controllers.

Further, the NMS 502 includes an exchanger 1206 to exchange the first ID with plurality of controllers.

Based on the exchange, i.e. response received from the plurality of controllers, a determiner 1208 of the NMS 502 determines at least one controller from which confirmation of the first ID is not received as a stale controller. In addition, the NMS 502 also determines the controllers from which confirmation of the first ID is received as the controllers-in-sync.

Figure 13:
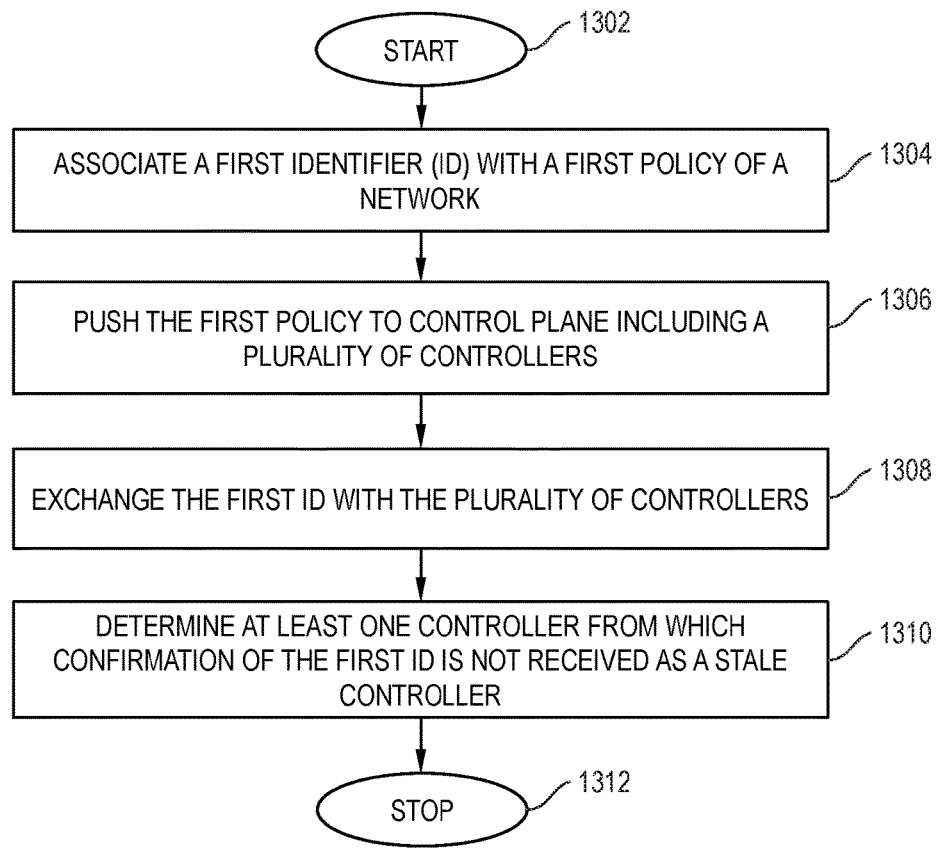
FIG. 13 illustrates a method for synchronizing policy in a control plane, in accordance with an example embodiment of the present disclosure.

It is to be appreciated that details of the functioning of the NMS 502 remains similar to that described in FIG. 13. The associator 1202, the pusher 1204, the exchanger 1206, and the determiner 1208 are logical modules that can be implemented using one or more processors or controllers as described in FIG. 10 and FIG. 11.

FIG. 13 illustrates a method for synchronizing policy in a control plane, in accordance with an example embodiment of the present disclosure.

The method starts at step 1302.

At step 1304, a first identifier (ID) is associated with a first policy (new policy) to be pushed to the network. The first ID is generated and associated using any existing technique by the NMS 502.

At step 1306, the first policy is pushed to the control plane including a plurality of controllers by the NMS 502. The first ID is also pushed to the plurality of controllers.

At step 1308, the first ID is exchanged with the plurality of controllers by the NMS 502. The controllers are supposed to confirm the presence of the first ID at the controllers.

At step 1310, at least one controller from the plurality of controllers is determined as a stale controller. The at least one controller does not send a confirmation of the first ID and hence, the NMS 502 does not receive the first ID from the at least one controller indicating that the at least one controller is to be marked as stale by the NMS 502 or by the management software 504. A broken connection exists with the stale controller. The NMS 502 does receive the confirmation of the first ID from other controllers which are determined as the controllers-in-sync.

The management software 504 or the NMS 502 then removes the stale controller from the list of valid controllers. The routers are configured to connect to the controllers-in-sync and to not connect to the stale controllers.

In various embodiments, the NMS 502 determines a list of stale controllers and a list of controllers-in-sync from among the plurality of controllers based on exchanging the first ID with the plurality of controllers, wherein the at least one state controller is determined based on non-receipt of confirmation of the first ID at the NMS while exchanging the first ID.

In addition, the method includes managing one or more connections of a router to the control plane such that the one or more connections of the router are prioritized with the list of controllers-in-sync over with the list of stale controllers. The managing can be performed by the NMS 502 or the management software 504 or the controller pool 506 or the controllers 508 or the routers 518.

The NMS 502 may then receive a second policy from a user of the NMS 502. The second policy (now the new policy) is associated by the NMS 502 with a second ID. The second ID is an incremented version of the first ID and is generated using any existing technique. The second policy is then pushed to the network without waiting for the broken connection to be set again. This prevents any delay in pushing the policy. The method also prevents split brain of the controllers. In addition, the method also maintain connection between controller and router as long as the router is connected to at least one controller that is in sync.

The method stops at step 1312.

Figure 14:
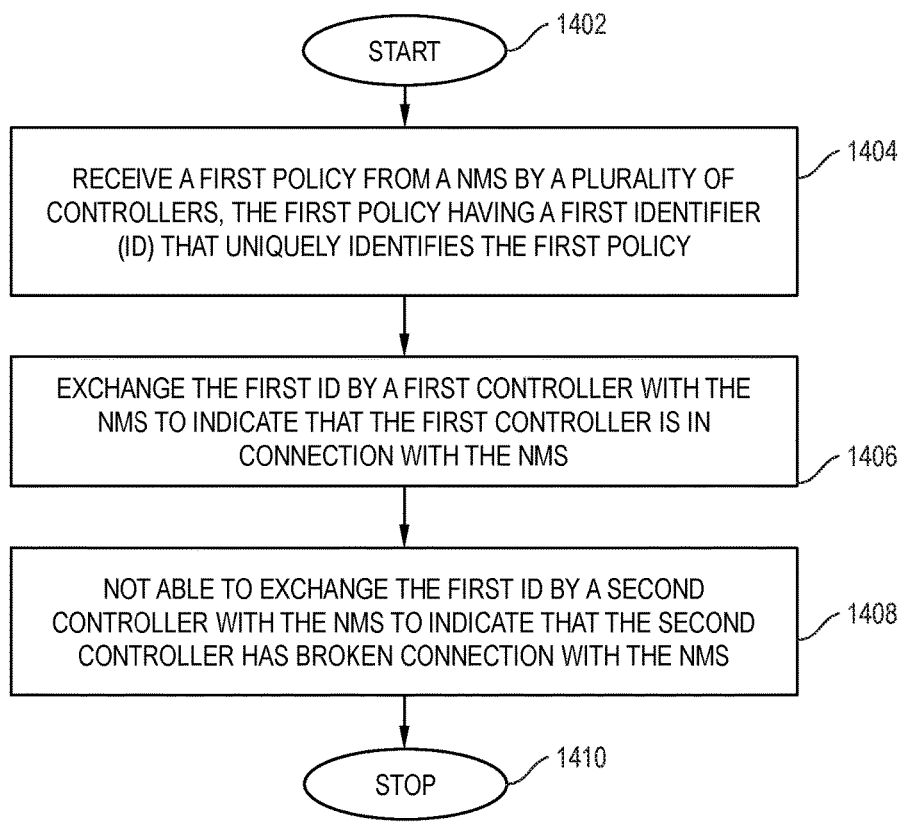
FIG. 14 illustrates a method for synchronizing policy in a control plane, in accordance with another example embodiment of the present disclosure.

FIG. 14 illustrates a method for synchronizing policy in a control plane, in accordance with another example embodiment of the present disclosure.

The method starts at step 1402.

At step 1404, a first policy is received by a plurality of controllers from the NMS 502. The first policy has a first ID that uniquely identifies the first policy. The first ID is generated by the NMS 502.

At step 1406, the first ID is exchanged by a first controller with the NMS 502 to indicate that the first controller is in connection with the NMS 502 and is identified as the controller-in-sync.

At step 1408, the ID is not exchanged by a second controller with the NMS 502 to indicate that the second controller has a broken connection with the NMS 502 and hence, the second controller is identified as a stale controller.

The NMS 502 may then receive a second policy from a user of the NMS 502. The second policy (now the new policy) is associated by the NMS 502 with a second ID. The second ID is an incremented version of the first ID and is generated using any existing technique. The second policy is then pushed to the network without waiting for the broken connection to be set again. The second policy is not received by the second controller but is received by the first controller. This prevents any delay in pushing the second policy to the first controllers. The method also prevents split brain of the controllers. In addition, the method also maintain connection between controller and router as long as the router is connected to at least one controller that is in sync.

In various embodiments, the NMS 502 determines a list of stale controllers and a list of controllers-in-sync from among the plurality of controllers based on exchanging the first ID with the plurality of controllers, wherein the at least one state controller is determined based on non-receipt of confirmation of the first ID at the NMS while exchanging the first ID.

In addition, the method includes managing one or more connections of a router to the control plane such that the one or more connections of the router are prioritized with the list of controllers-in-sync over with the list of stale controllers. The managing can be performed by the NMS 502 or the management software 504 or the controller pool 506 or the controllers 508 or the routers 518. The connection of the router is prioritized with a first controller over with the second controller.

The method stops at step 1410.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for synchronizing policy in a control plane, the method comprising:
    associating, by a network management system (NMS), a first identifier (ID) with a first policy of a network, the first ID uniquely identifying the first policy;
    pushing, by the NMS, the first policy to the control plane comprising a plurality of controllers;
    exchanging, by the NMS, the first ID with the plurality of controllers; and
    determining, by the NMS, at least one of the plurality of controllers from which confirmation of the first ID is not received is a stale controller.

2. The method as claimed in claim 1, wherein the determining of the at least one of the plurality of controllers is performed while exchanging the first ID.

3. The method as claimed in claim 1, further comprising:
    receiving, by the NMS, a second policy for pushing into the network; and
    associating, by the NMS, a second ID with the second policy, the second ID uniquely identifies the second policy.

4. The method as claimed in claim 3, wherein the second ID is incremented version of the first ID.

5. The method as claimed in claim 1, further comprising:
    identifying, by the NMS, a set of controllers of the plurality of controllers from which confirmation of the first ID is received as controllers-in-sync.

6. The method as claimed in claim 5, further comprising:
    managing one or more connections of a router to the control plane such that the one or more connections of the router are prioritized with the controllers-in-sync over another connection with the stale controller.

7. The method as claimed in claim 5, further comprising:
    receiving a request, by the controllers-in-sync, from a router to connect to at least one of the controllers-in-sync.

8. The method as claimed in claim 1, further comprising:
    assigning a marking to the stale controller.

9. A method for synchronizing policy in a control plane, the method comprising:
- receiving, by a plurality of controllers of a control plane, a first policy from a network management system (NMS), the first policy having a first identifier (ID) that uniquely identifies the first policy;
- exchanging, by a first controller of the plurality of controllers, the first ID with the NMS to indicate that the first controller is in connection with the NMS; and
- not exchanging, by a second controller of the plurality of controllers, the first ID with the NMS to indicate that the second controller has broken connection with the NMS.

10. The method as claimed in claim 9, further comprising:
- identifying, by the NMS, the first controller as a controller-in-sync and the second controller as a stale controller.

11. The method as claimed in claim 9, further comprising:
- prioritizing a connection of a router with the first controller over another connection with the second controller.

12. A network management system (NMS) comprising:
- a processor; and
- a memory coupled to the processor, the memory storing instructions which when executed cause the NMS to perform a method to synchronize policy in a control plane, the method comprising:
  - associating a first identifier (ID) with a first policy of a network, the first ID uniquely identifying the first policy;
  - pushing the first policy to the control plane comprising a plurality of controllers;
  - exchanging the first ID with the plurality of controllers; and
  - determining at least one of the plurality of controllers from which confirmation of the first ID is not received is a stale controller.

13. The system as claimed in claim 12, wherein the method further comprises:
- receiving a second policy for pushing into the network; and
- associating a second ID with the second policy, the second ID uniquely identifies the second policy.

14. The system as claimed in claim 12, wherein the second ID is incremented version of the first ID.

15. The system as claimed in claim 12, wherein the method further comprises:
- identifying a set of controllers of the plurality of controllers from which confirmation of the first ID is received as controllers-in-sync.

16. The system as claimed in claim 12, wherein the method further comprises:
- assigning a marking to the stale controller.

17. A non-transitory computer-readable medium having stored instructions which when executed by a network management system (NMS) causes the NMS to perform a method to synchronize policy in a control plane, the method comprising:
- associating a first identifier (ID) with a first policy of a network, the first ID uniquely identifying the first policy;
- pushing the first policy to the control plane comprising a plurality of controllers;
- exchanging the first ID with the plurality of controllers; and
- determining at least one of the plurality of controllers from which confirmation of the first ID is not received is a stale controller.

18. The non-transitory computer-readable medium as claimed in claim 17, wherein the method further comprises:
- identifying a set of controllers of the plurality of controllers from which confirmation of the first ID is received as controllers-in-sync.

19. A method for synchronizing policy in a control plane, the method comprising:
- associating, by a network management system (NMS), a first identifier (ID) with a first policy of a network, the first ID uniquely identifying the first policy;
- pushing, by the NMS, the first policy to the control plane comprising a plurality of controllers;
- determining, by the NMS, a list of stale controllers and a list of controllers-in-sync from among the plurality of controllers based on exchanging the first ID with the plurality of controllers, the list of stale controllers including at least one state controller determined to be on the list of stale controllers based on non-receipt of confirmation of the first ID at the NMS while exchanging the first ID; and
- managing one or more connections of a router to the control plane such that the one or more connections of the router are prioritized with the list of controllers-in-sync over with the list of stale controllers.

20. A system for synchronizing policy in a control plane, the system comprising:
- a plurality of controllers;
- a network management system (NMS) coupled to the plurality of controllers for
  - associating a first identifier (ID) with a first policy of a network, the first ID uniquely identifying the first policy,
  - pushing the first policy to the plurality of controllers, and
  - determining a list of stale controllers and a list of controllers-in-sync from among the plurality of controllers based on exchanging the first ID with the plurality of controllers, the list of stale controllers including at least one state controller determined to be on the list of stale controllers based on non-receipt of confirmation of the first ID at the NMS while exchanging the first ID; and
- one or more routers configured to connect with the list of controllers-in-sync over with the list of stale controllers.

* * * * *